(12) United States Patent  (10) Patent No.: US 9,188,350 B2
Choi et al.  (45) Date of Patent: Nov. 17, 2015

(54) HEAT PUMP SYSTEM FOR VEHICLE AND CONTROL METHOD THEREOF

(75) Inventors: Yong Hyun Choi, Hwaseong-si (KR); Jae Yeon Kim, Hwaseong-si (KR); Yong Woong Cha, Yongin-si (KR); Wan Je Cho, Suwon-si (KR); Jungha Park, Gunpo-si (KR); Jaesan Kim, Yongin-si (KR); Man Hee Park, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 315 days.

(21) Appl. No.: 13/316,298

(22) Filed: Dec. 9, 2011

(65) Prior Publication Data

US 2013/0019615 A1  Jan. 24, 2013

(30) Foreign Application Priority Data

Jul. 21, 1920  (KR) ........................ 10-2011-0072363

(51) Int. Cl.
*F24F 5/00*  (2006.01)
*B60H 1/00*  (2006.01)
*B60H 1/32*  (2006.01)
*F25B 30/00*  (2006.01)
*F25B 41/04*  (2006.01)
(Continued)

(52) U.S. Cl.
CPC .. *F24F 5/00* (2013.01); *B60H 1/00* (2013.01); *B60H 1/00914* (2013.01); *B60H 1/00921* (2013.01); *B60H 1/32* (2013.01); *F24F 11/02* (2013.01); *F25B 30/00* (2013.01); *F25B 41/04* (2013.01); *F25B 41/06* (2013.01); *B60H 2001/00128* (2013.01)

(58) Field of Classification Search
CPC ........ F24F 5/00; F24F 11/02; B60H 1/00921; B60H 1/00914; B60H 1/00; B60H 1/32; B60H 2001/00128; F25B 41/04; F25B 41/06; F25B 30/00
USPC ............................ 62/160, 173, 175, 199, 200
See application file for complete search history.

(56) References Cited

U.S. PATENT DOCUMENTS

| | | | |
|---|---|---|---|
| 3,759,056 A | | 9/1973 | Graber |
| 5,586,448 A | * | 12/1996 | Ikeda ................. B60H 1/00392 62/156 |
| 5,706,664 A | * | 1/1998 | Hara ..................... F25B 43/006 165/240 |

(Continued)

FOREIGN PATENT DOCUMENTS

| | | |
|---|---|---|
| CN | 1673647 A | 9/2005 |
| CN | 1316210 C | 5/2007 |

(Continued)

*Primary Examiner* — Allana Lewin Bidder
*Assistant Examiner* — Kun Kai Ma
(74) *Attorney, Agent, or Firm* — Morgan, Lewis & Bockius LLP

(57) ABSTRACT

A method for controlling a heat pump system is provided with air conditioning means connected to a controller and including a plurality of valves and expansion valves connected to each other through a refrigerant line and a bypass line, a compressor, an accumulator, an evaporator, an exterior condenser, an interior condenser, and an HVAC module having a PTC heater and a door at a warming mode, a cooling mode, a dehumidification mode, a dehumidification/defrosting mode, or an extremely low temperature dehumidification/defrosting mode according to selection of a driver.

11 Claims, 6 Drawing Sheets

(51) Int. Cl.
　　　*F25B 41/06*　　(2006.01)
　　　*F24F 11/02*　　(2006.01)

(56) References Cited

U.S. PATENT DOCUMENTS

| | | | |
|---|---|---|---|
| 5,769,316 A * | 6/1998 | Ikeda | B60H 1/00921 236/38 |
| 5,983,652 A | 11/1999 | Iritani et al. | |
| 6,047,770 A * | 4/2000 | Suzuki | B60H 1/00007 165/202 |
| 6,422,308 B1 * | 7/2002 | Okawara | B60H 1/00878 165/202 |
| 6,920,922 B2 | 7/2005 | Takeuchi | |
| 7,607,315 B2 * | 10/2009 | Ohta | F25B 9/008 62/217 |
| 2003/0182961 A1 * | 10/2003 | Nishida | B60H 1/00921 62/324.1 |
| 2004/0055305 A1 * | 3/2004 | Kuroda et al. | 60/698 |
| 2004/0079096 A1 * | 4/2004 | Itoh | B60H 1/00735 62/223 |
| 2008/0196877 A1 | 8/2008 | Zeigler et al. | |
| 2008/0276636 A1 * | 11/2008 | Thybo et al. | 62/228.3 |
| 2009/0241569 A1 | 10/2009 | Okada et al. | |
| 2011/0016896 A1 * | 1/2011 | Oomura et al. | 62/155 |
| 2011/0167849 A1 * | 7/2011 | Kobayashi | B60H 1/00914 62/159 |
| 2011/0167850 A1 * | 7/2011 | Itoh | F25B 5/04 62/160 |

FOREIGN PATENT DOCUMENTS

| | | | |
|---|---|---|---|
| CN | 100384652 | C | 4/2008 |
| JP | 7-5825 | U | 1/1995 |
| JP | 7-329544 | A | 12/1995 |
| JP | 8-197937 | A | 8/1996 |
| JP | 08-258548 | A | 10/1996 |
| JP | 9-295512 | A | 11/1997 |
| JP | 3196341 | | 6/2001 |
| JP | 2002352867 | A * | 12/2002 |
| JP | 2003-74995 | A | 3/2003 |
| JP | 2003-136945 | A | 5/2003 |
| JP | 2003-170733 | A | 6/2003 |
| JP | 2004-216934 | A | 8/2004 |
| JP | 2005-9789 | A | 1/2005 |
| JP | 2005-514253 | A | 5/2005 |
| JP | 2006-1455 | A | 1/2006 |
| JP | 2008-145022 | A | 6/2008 |
| JP | 2008-308080 | A | 12/2008 |
| JP | 2009-184494 | A | 8/2009 |
| JP | 2009-280020 | A | 12/2009 |
| JP | 2010-90729 | A | 4/2010 |
| JP | 2010-281561 | A | 12/2010 |
| JP | 2011-5981 | A | 1/2011 |
| KR | 2001-0029358 | A | 4/2001 |
| KR | 10-0610941 | B1 | 8/2006 |
| KR | 10-2006-0118583 | A | 11/2006 |
| KR | 10-2007-0039282 | A | 4/2007 |
| KR | 10-2007-0075119 | A | 7/2007 |
| KR | 1020090021602 | A | 3/2009 |
| KR | 10-2010-0026601 | A | 3/2010 |
| WO | WO 2005/113982 | A1 | 12/2005 |

* cited by examiner

HEAT PUMP SYSTEM FOR VEHICLE AND CONTROL METHOD THEREOF

CROSS-REFERENCE TO RELATED APPLICATION

This application claims priority to and the benefit of Korean Patent Application No. 10-2011-0072363 filed Jul. 21, 2011, the entire contents of which application is incorporated herein for all purposes by this reference.

BACKGROUND OF INVENTION

1. Field of Invention

The present invention relates to a heat pump system for a vehicle and a control method thereof. More particularly, the present invention relates to a heat pump system for a vehicle and a control method thereof that improve heating performance and dehumidification performance of the vehicle and prevent frost of an exterior condenser by controlling flow of a refrigerant and increase mileage by minimizing power consumption of a positive temperature coefficient (PTC) heater.

2. Description of Related Art

Generally, an air conditioning system for a vehicle includes an air conditioning module warming or cooling a cabin of the vehicle.

Such an air conditioning module circulates a heat-exchanging medium through a condenser, a receiver drier, an expansion valve, and an evaporator by operation of a compressor. After that, the heat-exchanging medium flows back to the compressor. At this process, the air conditioning module warms up the cabin of the vehicle through heat exchange at the evaporator or cools the cabin of the vehicle through heat exchange with a coolant at a heater.

Meanwhile, energy efficiency and environmental pollution are of increasing concern, and environmentally-friendly vehicles substituting vehicles having an internal combustion engine have been researched. Such environmentally-friendly vehicles include electric vehicles using fuel cell or electricity as power source, or hybrid vehicles driven by an engine and an electric battery.

An air conditioning system of an electric vehicle among the environmentally-friendly vehicle, different from that of a typical vehicle, does not use a separate heater. An air conditioning system applied to an electric vehicle is typically called a heat pump system.

According to the heat pump system, a high temperature/pressure gaseous refrigerant compressed at a compressor is condensed at a condenser and then is supplied to an evaporator passing through a receiver drier and an expansion valve at a cooling mode in the summer. The gaseous refrigerant is evaporated at the evaporator and lowers temperature and humidity of the cabin. However, the heat pump system has characteristics that the high temperature/pressure gaseous refrigerant is used as a heater medium at a warming mode in the winter.

That is, the high temperature/pressure gaseous refrigerant is supplied not to an exterior condenser but to an interior condenser through a valve and is heat-exchanged with an air at the warming mode in the electric vehicle. The heat-exchanged air passes through a positive temperature coefficient (PTC) heater. After that, the air flows into the cabin of the vehicle and raises a cabin temperature of the vehicle.

The high temperature/pressure gaseous refrigerant flowing into the interior condenser is condensed through heat exchange with the air and is flowed out in a state of liquid refrigerant.

According to a conventional heat pump system, the air of a very low temperature or a low temperature is heat-exchanged with the refrigerant at the interior condenser and the refrigerant of a very low temperature is flowed from the interior condenser to the exterior condenser in the winter. Since a surface of the exterior condenser is frozen, heat-exchanging efficiency and heating performance and efficiency of the heat-exchanging medium may be deteriorated. In addition, since humidity becomes high due to a condensed water remaining at an exterior of the evaporator in a case that a conversion from the cooling mode to the warming mode occurs, moisture condenses on a vehicle window and dehumidification performance may be deteriorated.

To solve such problems, the compressor stops operating and warming is performed only by the PTC heater at a defrosting mode where a surface of the exterior condenser is defrosted. Therefore, heating performance may be seriously deteriorated, heating load may be increased due to increase of power consumption, and mileage may be shortened at a driving with warming.

In addition, since heat for converting a liquid refrigerant into the gaseous refrigerant is insufficient when the liquid refrigerant flows into the from the interior condenser, compress efficiency may be deteriorated, heating performance may be seriously deteriorated when an air temperature is low, the system may be unstable, and durability of the compressor may be deteriorated when the liquid refrigerant flows into the compressor.

In addition, noise and vibration may occur due to frequent open/close operation of a 2-way valve at a dehumidification mode where moisture is removed from the cabin of the vehicle.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a heat pump system for a vehicle and a control method thereof having advantages of improving heating performance and dehumidification performance and preventing frost of an exterior condenser by controlling flow of a refrigerant.

In addition, the present invention has been made in an effort to provide a heat pump system for a vehicle and a control method thereof having further advantages of increasing mileage of the vehicle with the same power by reducing power consumption of a positive temperature coefficient (PTC) heater of the vehicle.

A heat pump system for a vehicle according to various aspects of the present invention includes air conditioning means for cooling or warming up a cabin of the vehicle by using a refrigerant circulating through refrigerant line.

Various aspects of the present invention provide for an air conditioning means including an exterior condenser provided in an engine compartment of the vehicle, condensing the refrigerant through heat exchanged with an air, and provided with a cooling fan at the rear thereof; an HVAC module fluidly communicated with the exterior condenser, and provided with an evaporator and a door adapted to or not to flow the air passing through the evaporator into an interior condenser and a PTC heater selectively according to warming, cooling, or dehumidification mode; a compressor connected to the evaporator through a refrigerant line and adapted to compress gaseous refrigerant; an accumulator provided on the refrigerant line between the compressor and the evaporator and adapted to supply the gaseous refrigerant to the compressor; a first valve adapted to selectively supply the refrigerant flowing from the compressor to the interior condenser or the exterior condenser according to the mode of the vehicle; a first expansion valve adapted to receive the refrigerant passing through the interior condenser and to expanding the refrigerant; a second valve adapted to selectively supply the refrigerant expanded at the first expansion valve and passing through the exterior condenser to the evaporator or to the accumulator; a second expansion valve disposed between the evaporator and the second valve, and adapted to expand the refrigerant passing through the second valve; a bypass line flowing the refrigerant passing through the interior condenser into the evaporator or the accumulator without passing through the exterior condenser by operation of the second valve; and a third valve provided at the bypass line and adapted to selectively supply the refrigerant to the refrigerant line connected to the second valve.

A pressure sensor may be mounted at the refrigerant line connecting the compressor with the first valve.

Each of the first and second valves may be 3-way valve.

The air conditioning means may be connected to a controller and is operated by a control signal of the controller.

Various aspects of the present invention provide for a method for controlling a heat pump system provided with air conditioning means connected to a controller and including a plurality of valves and expansion valves connected to each other through a refrigerant line and a bypass line, a compressor, an accumulator, an evaporator, an exterior condenser, an interior condenser, and an HVAC module having a PTC heater and a door at a warming mode, a cooling mode, a dehumidification mode, a dehumidification/defrosting mode, or an extremely low temperature dehumidification/defrosting mode according to selection of a driver is disclosed.

At the warming mode, a refrigerant, a temperature of which is raised at the exterior condenser through heat exchange with an air, may be supplied to the interior condenser of the HVAC module after being compressed to a gaseous refrigerant of high temperature/pressure by passing through the accumulator and the compressor, the refrigerant passing through the interior condenser may be expanded by the expansion valve and may be supplied to the exterior condenser, and a temperature of an air passing through the evaporator of the HVAC module may rise by selective operation of the interior condenser and the PTC heater, thereby a cabin of the vehicle is warmed up.

At the cooling mode, the refrigerant of low temperature cooled at the exterior condenser by operation of the cooling fan and heat exchange with the air may be supplied to the evaporator after being expanded by another expansion valve, the refrigerant evaporated at the evaporator by heat exchanged with the air may be supplied to the exterior condenser after being compressed at the accumulator and the compressor, and the air may be cooled at the evaporator by heat exchanged with the refrigerant is directly flowed into the cabin of the vehicle without being flowed into the interior condenser, thereby the cabin of the vehicle is cooled.

At the dehumidification mode, the refrigerant of low temperature cooled at the exterior condenser by heat exchanged with the air may be expanded at another expansion valve, and the expanded refrigerant may be supplied to the evaporator, the refrigerant evaporated at the evaporator by heat exchange with the air may be supplied to the interior condenser after being compressed by passing through the accumulator and the compressor, the refrigerant passing through the interior condenser may be supplied to the exterior condenser after being expanded at the expansion valve and is circulated, and the air cooled during passing through the evaporator of the HVAC module may be supplied to the cabin of the vehicle after passing through the interior condenser and the PTC heater, thereby the cabin of the vehicle is dehumidified.

The controller may control expansion amount of the refrigerant by controlling openings of the expansion valves at the dehumidification mode.

At the dehumidification/defrosting mode, the refrigerant of low temperature cooled at the exterior condenser by heat exchanged with the air may be expanded at another expansion valve, and the expanded refrigerant may be supplied to the evaporator, the refrigerant evaporated at the evaporator by heat exchange with the air may be supplied respectively to the exterior condenser and the interior condenser after being compressed by passing through the accumulator and the compressor, the refrigerant passing through the interior condenser may be supplied back to another expansion valve, and the refrigerant expanded at another expansion valve may be supplied to the evaporator and is circulated, the air cooled during passing through the evaporator of the HVAC module is supplied to the cabin of the vehicle after passing through the interior condenser and the PTC heater, thereby the cabin of the vehicle may be dehumidified, and the compressed refrigerant may be supplied to the exterior condenser and defrosts the exterior condenser, a surface of which is frozen.

At the dehumidification/defrosting mode in a case when an ambient temperature is an extremely low temperature, the refrigerant may be supplied to the evaporator after being expanded at another expansion valve, the refrigerant evaporated at the evaporator by heat exchange with the air may be supplied to the interior condenser after being compressed during passing through the accumulator and the compressor, the refrigerant passing through the interior condenser may be supplied back to the expansion valve along the bypass line, and the refrigerant expanded at the expansion valve may be supplied to the evaporator and is circulated, the air cooled during passing through the evaporator of the HVAC module may be supplied to the cabin of the vehicle after passing through the interior condenser and the PTC heater, thereby the cabin of the vehicle is dehumidified, and the compressed refrigerant is not supplied to the exterior condenser such that the exterior condenser is defrosted.

The controller may be adapted to control operation of the cooling fan according to a temperature of the vehicle and a temperature of the refrigerant at the warming mode, the cooling mode, the dehumidification mode, or the dehumidification/defrosting mode.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Figure 1:
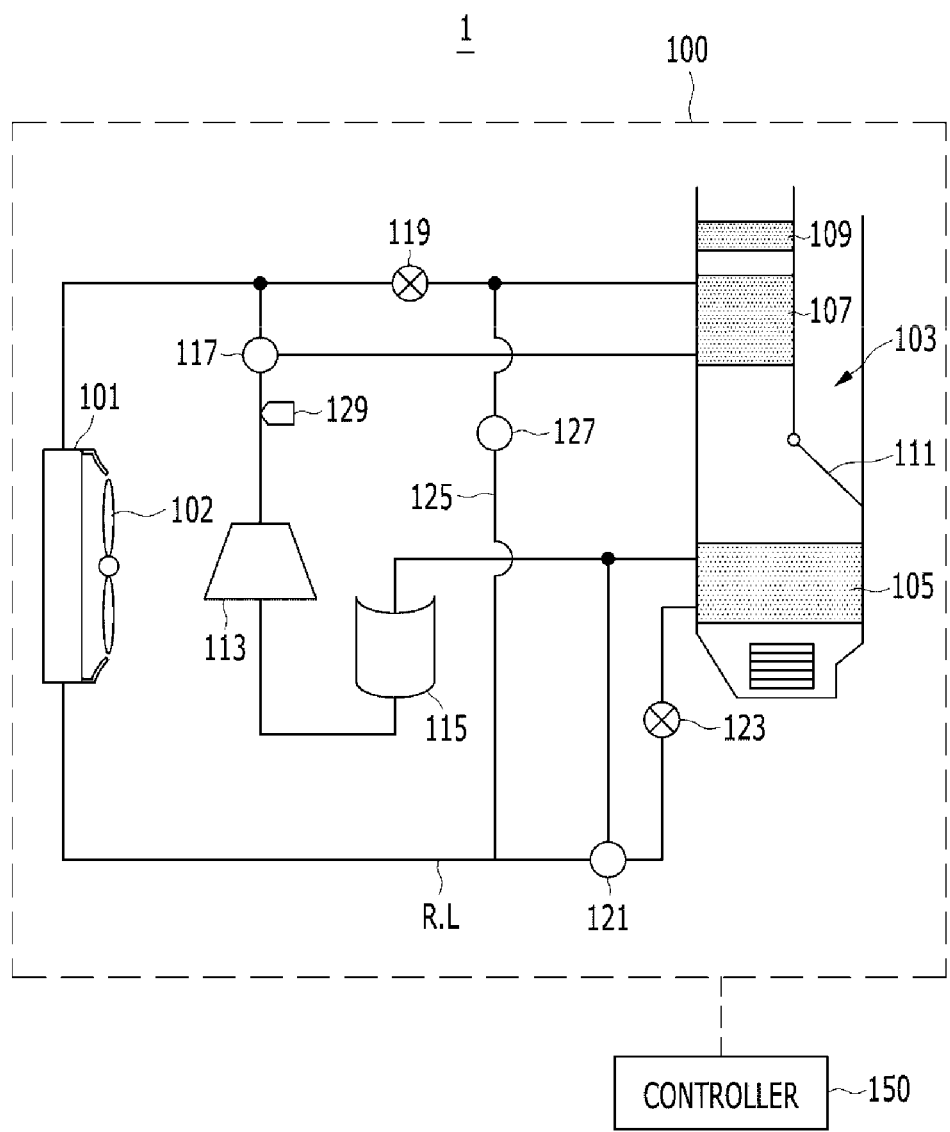
FIG. 1 is a schematic diagram of an exemplary heat pump system for a vehicle according to the present invention.

FIG. 1 is a schematic diagram of a heat pump system for a vehicle according to various embodiments of the present invention.

Referring to the drawings, a heat pump system 1 for a vehicle and a control method thereof according to various embodiments of the present invention improves heating performance and dehumidification performance and prevents frost of an exterior condenser by controlling flow of a refrigerant.

In addition, mileage of the vehicle may be increased with the same fuel consumption by reducing power consumption of a positive temperature coefficient (PTC) heater at a warming mode and a dehumidification mode of the vehicle.

For this purpose, a heat pump system 1 for the vehicle according to various embodiments of the present invention, as shown in FIG. 1, includes air conditioning means 100 which controls warming or cooling of a cabin of the vehicle by using the refrigerant circulating through a refrigerant line R.L provided in the vehicle.

The air conditioning means 100 includes an exterior condenser 101, an Heating, Ventilation and Air Conditioning (HVAC) module 103, a compressor 113, an accumulator 115, first, second, and third valves 117, 121, and 127, first and second expansion valves 119 and 123, and a bypass line 125, and the constituent elements consisting of the air conditioning means 100 will be described in detail.

The exterior condenser 101 is provided in an engine compartment of the vehicle and condenses a refrigerant through heat exchange with an air. A cooling fan 102 blows wind to the exterior condenser 101 and is mounted at the rear of the exterior condenser 101.

If the refrigerant flows into the exterior condenser 101, the exterior condenser 101 selectively cools and condenses the refrigerant by using the air flowing into the exterior condenser 101 and the wind blown from the cooling fan 102.

According to various embodiments, the HVAC module 103 is connected to the exterior condenser 101 through the refrigerant line R.L, and includes a door 111 formed therein. The door 111 controls the air passing through an evaporator 105 to selectively flow into an interior condenser 107 and a PTC heater 109 according to warming, cooling, dehumidification, and dehumidification/defrosting modes.

That is, the door 111 is open so as to flow the air passing through the evaporator 105 into the interior condenser 107 and the PTC heater 109 at the warming mode of the vehicle, and is closed so as for the air cooled when passing through the evaporator 105 not to flow into the interior condenser 107 and the PTC heater 109 and to be directly supplied into the vehicle.

In addition, the compressor 113 is connected to the evaporator 105 through the refrigerant line R.L and compresses the refrigerant of gaseous state.

In various embodiments, the accumulator 115 is disposed on the refrigerant line R.L between the compressor 113 and the evaporator 105 and is adapted to supply only the gaseous refrigerant to the compressor 113.

That is, after the accumulator 115 stores a liquid refrigerant therein, the stored liquid refrigerant is gasified and is then supplied to the compressor 11. Thereby, efficiency and durability of the compressor 113 may be improved.

The first valve 117 selectively supplies the refrigerant flowing out from the compressor 113 to the interior condenser 107 or the exterior condenser 101 according to the modes of the vehicle.

Herein, a pressure sensor 129 is mounted on the refrigerant line R.L connecting the compressor 113 with the first valve 117 and detects a pressure of the refrigerant flowing out from the compressor 113.

In addition, the first expansion valve 119 receives and expands the refrigerant passing through the interior condenser 107.

In various embodiments, the second valve 121 selectively supplies the refrigerant expanded at the first expansion valve 119 and passing through the exterior condenser 101 to the evaporator 105 or the accumulator 115.

That is, the first valve 117 supplies the refrigerant to the exterior condenser 101 or the interior condenser 105, and the second valve 121 supplies the refrigerant to the accumulator 115 or the second expansion valve 123. Each of the first valve 117 and the second valve 121 is a 3-way valve that opens or closes the refrigerant line R.L selectively.

The second expansion valve 123 is disposed between the evaporator 105 and the second valve 121, and expands the refrigerant received from the second valve 121.

In addition, the bypass line 125 flows the refrigerant passing through the interior condenser 105 selectively into the evaporator 105 or the accumulator 115 by operation of the second valve 121 without passing through the exterior condenser 101.

The third valve 127 is mounted on the bypass line 125 and selectively supplies the refrigerant to the refrigerant line R.L connected to the second valve 121.

The air conditioning means 100 is connected to a controller 150 and is operated by control signals of the controller 150.

That is, the controller 150 controls operation of the cooling fan 102, open/close operation of the door 111 of the HVAC module 103, open/close operation of the first, second, and third valves 117, 121, and 127, and expansion amount of the refrigerant by controlling the first and second expansion valves 119 and 123 according to the warming mode, the cooling mode, the dehumidification mode, and the dehumidification/defrosting mode of the vehicle that are selected by a driver.

Operation and control method of the heater pump system for the vehicle according to various embodiments of the present invention will be hereinafter described in detail with reference to FIG. 2 to FIG. 6.

FIG. 2 to FIG. 6 are operational charts of a heat pump system for a vehicle according to various embodiments of the present invention at a warming mode, a cooling mode, a dehumidification mode, a dehumidification/defrosting mode, and a dehumidification/defrosting mode in a case when an ambient temperature is an extremely low temperature.

Herein, each mode of the heat pump system 1 can be selected by the driver or controlled automatically.

Figure 2:
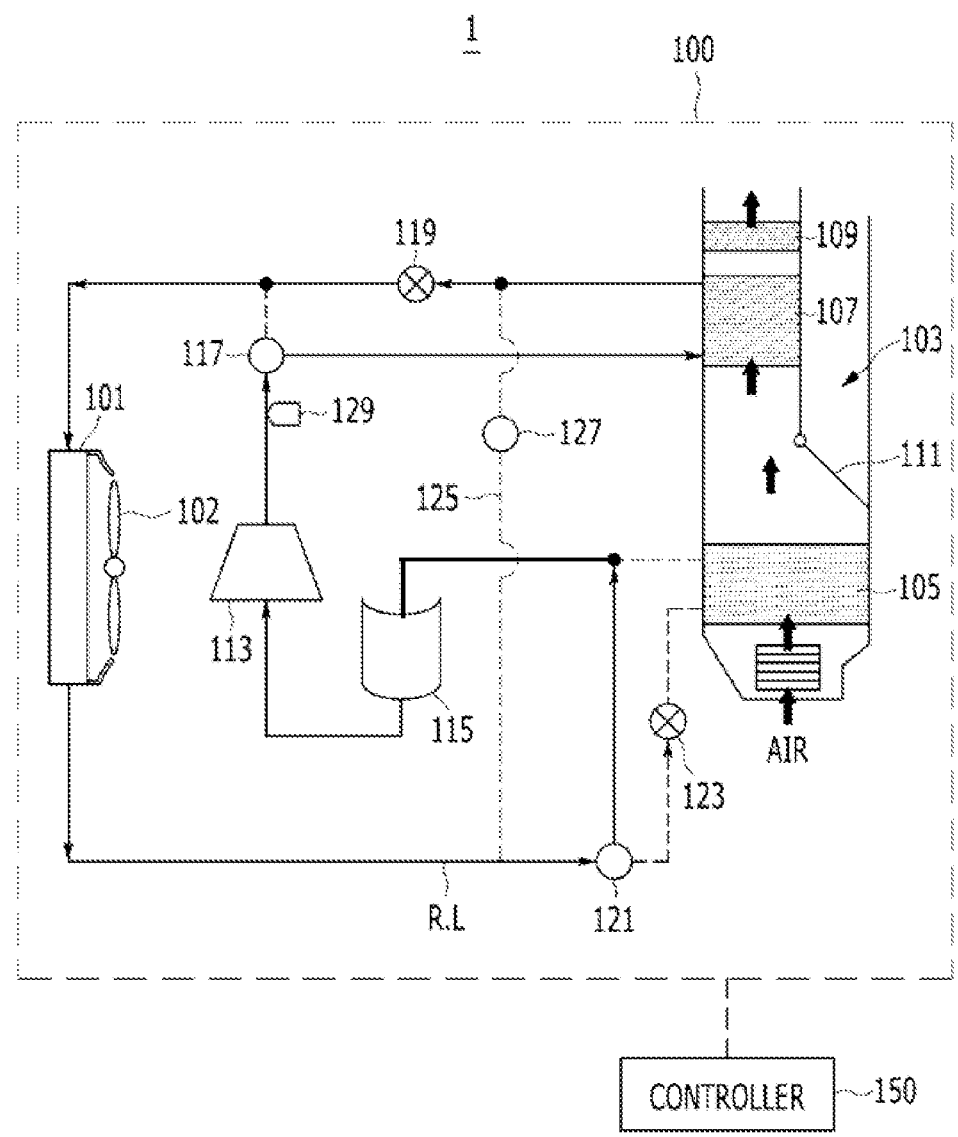
FIG. 2 is an operational chart of an exemplary heat pump system for a vehicle according to the present invention at a warming mode.

Referring to FIG. 2, operation and control method of the heat pump system 1 at the warming mode will be described.

Referring to FIG. 2, a temperature of the refrigerant rises through heat exchange with the air at the exterior condenser 101 at the warming mode. At this time, cooling of the refrigerant flowing into the exterior condenser 101 is retarded or prevented by stopping the cooling fan 102 or reducing a speed of the cooling fan 102. At this state, the refrigerant flowing in through the refrigerant line R.L is heat exchanged with the air and the temperature thereof increases.

The refrigerant passes through the accumulator 115 and the compressor 113 along the refrigerant line R.L by operation of the second valve 121 and is compressed into the high temperature/pressure gaseous refrigerant. After that, the gaseous refrigerant is supplied to the interior condenser 107 of the HVAC module 103 by operation of the first valve 117.

Herein, the controller 150 controls rotation of the cooling fan 102 and opening of the first valve 117 according to a pressure of the refrigerant flowing out from the compressor 113.

That is, the refrigerant is compressed into the high temperature/pressure gaseous refrigerant during passing through the compressor 113, and the compressed gaseous refrigerant flows into the interior condenser 107 by opening the refrigerant line R.L connected to the interior condenser 107 by operation of the first valve 117.

At this time, the pressure sensor 129 detects the pressure of the refrigerant flowing out from the compressor 113 and outputs the detected value to the controller 150.

In addition, the controller 150 determines of the pressure of the refrigerant from the detected value by the pressure sensor 129 and controls the opening of the first valve 117 according to demanded vehicle performance.

The refrigerant passing through the interior condenser 107 is expanded at the first expansion valve 119. The refrigerant is supplied to the exterior condenser 101 along the refrigerant line R.L.

Finally, the refrigerant circulates through the refrigerant line R.L.

That is, when the high temperature/pressure gaseous refrigerant is supplied to the interior condenser 107, the controller 150 opens the door 111 such that the air passing through the evaporator 105 of the HVAC module 103 passes through the interior condenser 107 at the warming mode.

Accordingly, the inflow air with a room temperature passes through the evaporator 105 to which the refrigerant is not supplied, and is converted into high temperature during passing through the interior condenser 107. In addition, after the temperature of the air further rises by selective operation of the PTC heater 109, the air is supplied to the cabin of the vehicle. Therefore, the cabin of the vehicle is warmed up.

In various embodiments, the operation and the control method of the heat pump system 1 at the cooling mode will be described in detail referring to FIG. 3.

Figure 3:
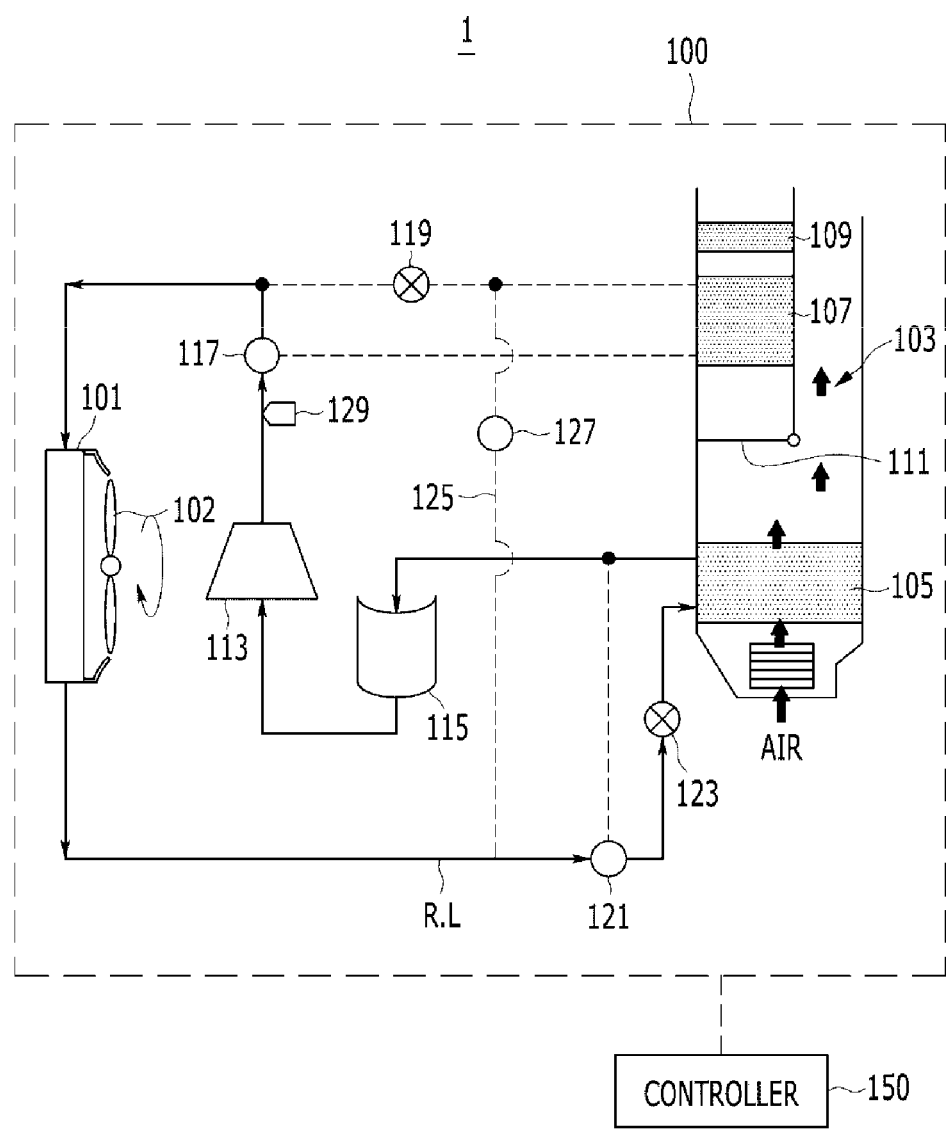
FIG. 3 is an operational chart of an exemplary heat pump system for a vehicle according to the present invention at a cooling mode.

As shown in FIG. 3, the refrigerant of low temperature cooled and condensed through operation of the cooling fan 102 and heat exchange with the air is supplied from the exterior condenser 101 to the second expansion valve 123 through the second valve 121 at the cooling mode of the vehicle. After that, the refrigerant is supplied to the evaporator 105.

At this time, since the exterior condenser 101 is disposed at a front portion of the vehicle, the refrigerant is cooled and condensed maximumly by the cooling fan 102 operated with maximum speed by the control signal of the controller 150 and the inflow air during driving.

At this state, the controller 150 operates the second valve 121 and opens the refrigerant line R.L such that the refrigerant cooled and condensed during passing through the exterior condenser 101 is flowed into the second expansion valve 123 connected to the evaporator 105 of the HVAC module 103.

The refrigerant of low temperature flowing into the second expansion valve 123 is expanded and is then supplied to the evaporator 105 along the refrigerant line R.L.

After that, the refrigerant is evaporated through heat exchange with the air at the evaporator 105, and is compressed during passing through the accumulator 115 and the compressor 113 along the refrigerant line R.L.

The refrigerant compressed at the compressor 113 is flowed back into the exterior condenser 101 by operation of the first valve 117. Finally, the refrigerant circulates along the refrigerant line R.L.

The air flowing into the HVAC module 103 is cooled at the evaporator 105 by the refrigerant of low temperature flowing into the evaporator 105.

At this time, the door 111 is configured for the cooled air not to pass through the interior condenser 107 and the PTC heater 109. Therefore, the cooled air is directly supplied to the cabin of the vehicle and the cabin of the vehicle is cooled.

Operation and control method of the heat pump system 1 at the dehumidification mode will be described in detail referring to FIG. 4.

Figure 4:
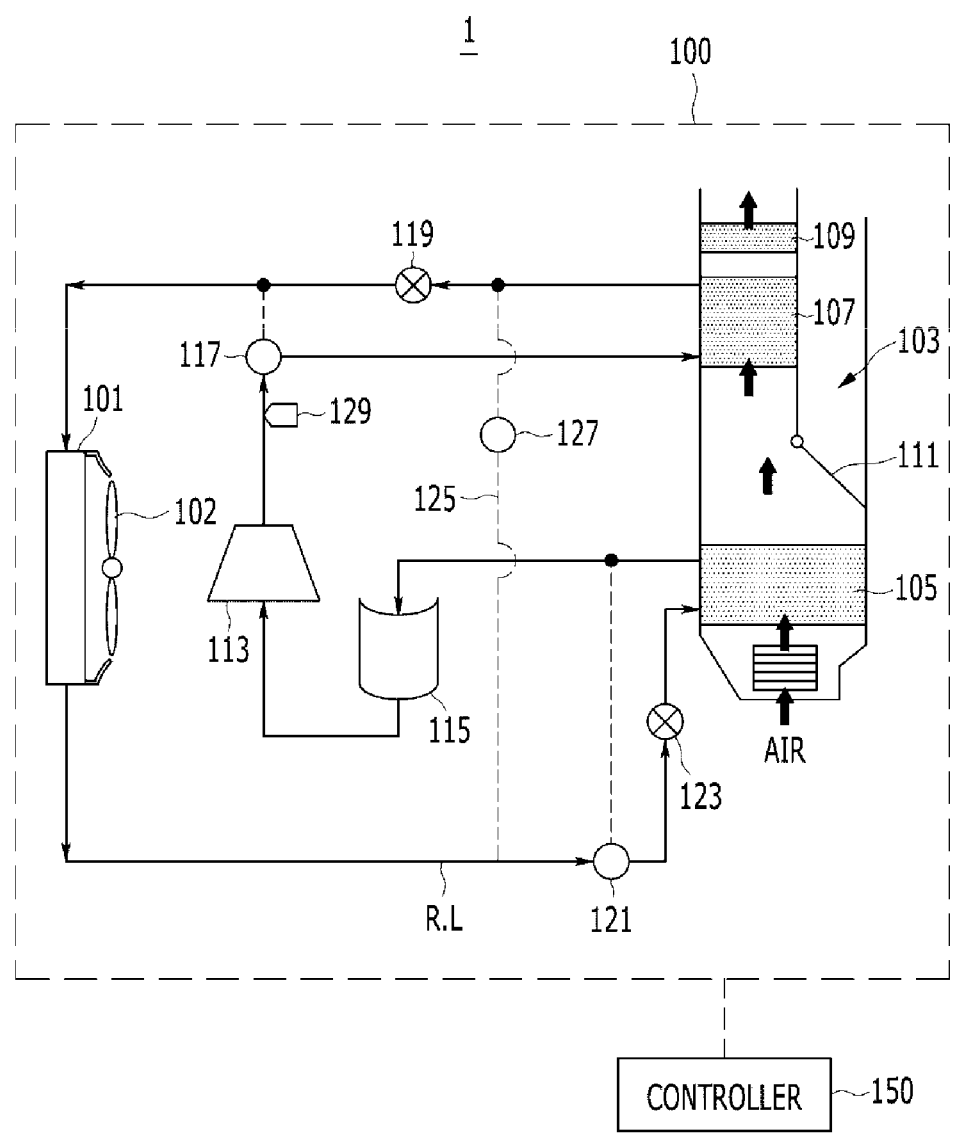
FIG. 4 is an operational chart of an exemplary heat pump system for a vehicle according to the present invention at a dehumidification mode.

As shown in FIG. 4, the controller 150 opens the second valve 121 such that the refrigerant of low temperature cooled at the exterior condenser 101 by the air and operation of the cooling fan 102 flows into the second expansion valve 123 at the dehumidification mode.

The refrigerant of low temperature flowing into the second expansion valve 123 is expanded and is then supplied to the evaporator 105 along the refrigerant line R.L.

After that, the refrigerant is evaporated at the evaporator 105 through heat exchange with the air, and is compressed into the high temperature/pressure gaseous refrigerant during passing through the accumulator 115 and the compressor 113 along the refrigerant line R.L.

In addition, the refrigerant line R.L connected to the interior condenser 107 is open by operation of the first valve 117, and the compressed gaseous refrigerant is supplied to the interior condenser 107.

The pressure sensor 129 mounted on the refrigerant line R.L between the compressor 113 and the first valve 117 detects the pressure of the refrigerant flowing out from the compressor 113 and outputs the detected value to the controller 150.

The controller 150 determines of the pressure of the refrigerant from the detected valued by the pressure sensor 129 and controls opening of the first valve 117 according to the demanded vehicle performance.

In addition, the refrigerant passing through the interior condenser 107 is expanded at the first expansion valve 119 and is then flowed into the exterior condenser 101. Finally, the refrigerant circulates along the refrigerant line R.L.

In this case, the controller 150 controls expansion amount of the refrigerant by controlling the openings of the first and second expansion valves 119 and 123.

The air flowing into the HVAC module 103 is cooled at the evaporator 105 by the refrigerant of low temperature flowing into the evaporator 105.

At this time, the inflow air is dehumidified during passing through the evaporator 105, and the door 111 is adapted for the cooled air to pass through the interior condenser 107. After that, the air is heated at the interior condenser 107 and is then flowed into the cabin of the vehicle. Therefore, the cabin of the vehicle is dehumidified.

In various embodiments, the heat pump system 1 further has the dehumidification/defrosting mode where the surface of the exterior condenser 101 is defrosted at the defrosting mode.

Figure 5:
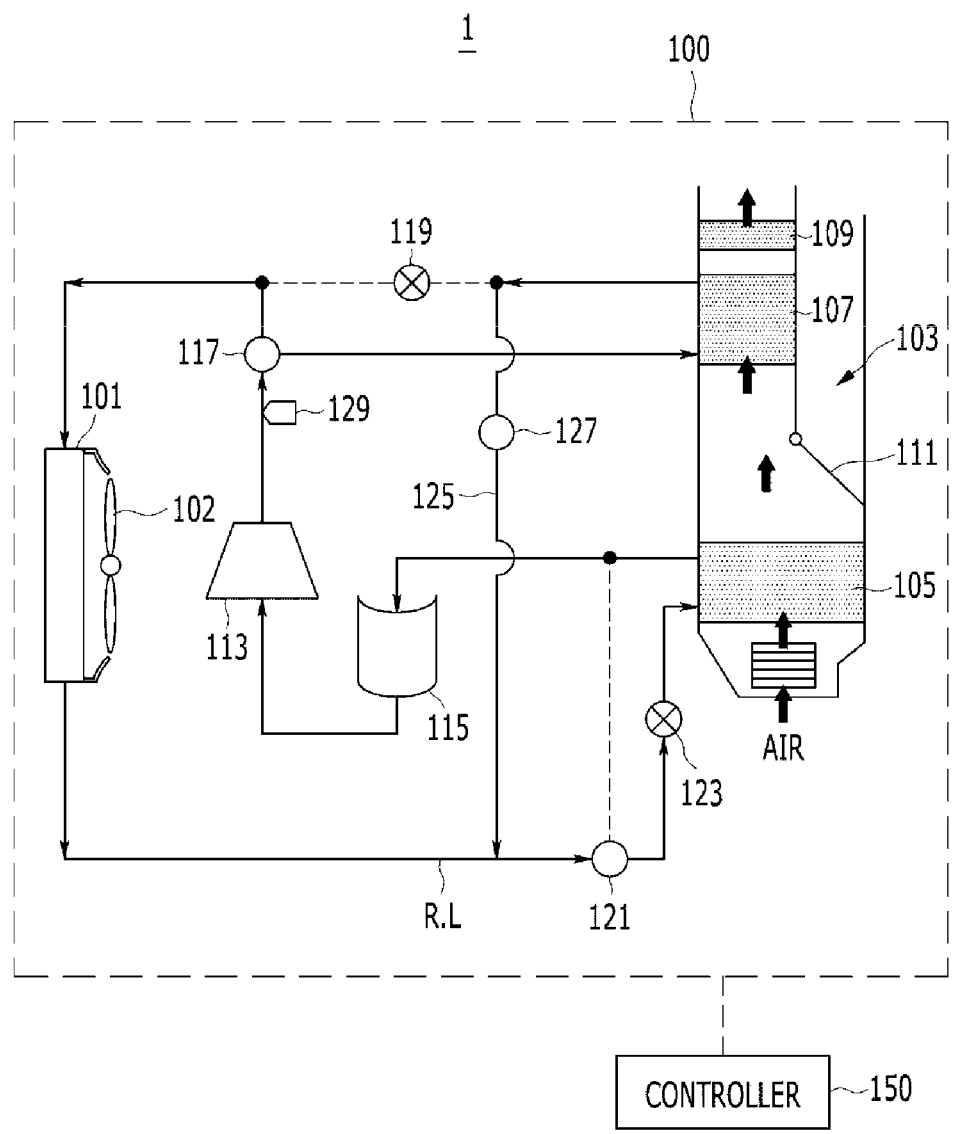
FIG. 5 is an operational chart of an exemplary heat pump system for a vehicle according to the present invention at a dehumidification/defrosting mode.

Referring to FIG. 5, operation and control method of the heat pump system 1 according to various embodiments of the present invention at the dehumidification/defrosting mode will be described in detail.

As shown in FIG. 5, the controller 150 opens the second valve 121 such that the refrigerant of low temperature cooled at the exterior condenser 101 by the air and operation of the cooling fan 102 flows into the second expansion valve 123 at the dehumidification/defrosting mode.

The refrigerant of low temperature flowing into the second expansion valve 123 is expanded and is then supplied to the evaporator 105 along the refrigerant line R.L.

After that, the refrigerant is evaporated at the evaporator 105 through heat exchange with the air, and is compressed into the high temperature/pressure gaseous refrigerant during passing through the accumulator 115 and the compressor 113 along the refrigerant line R.L.

As described above, the compressed refrigerant of high temperature/pressure is simultaneously supplied to the exterior condenser 101 and the interior condenser 107 along the refrigerant line R.L by operation of the first valve 117.

The pressure sensor 129 mounted on the refrigerant line R.L between the compressor 113 and the first valve 117 detects the pressure of the refrigerant flowing out from the compressor 113 and outputs the detected value to the controller 150.

The controller 150 determines of the pressure of the refrigerant from the detected valued by the pressure sensor 129 and controls opening of the first valve 117 according to the demanded vehicle performance.

In addition, the refrigerant passing through the interior condenser 107 is flowed along the bypass line 125 by operation of the third valve 127 and is joined to the refrigerant passing through the exterior condenser 101 by operation of the second valve 121. After that, the refrigerant is expanded at the second expansion valve 123 and is supplied to the evaporator 105. Finally, the refrigerant circulates along the refrigerant line R.L.

In this case, the controller 150 controls expansion amount of the refrigerant by controlling the opening of the second expansion valve 123.

The air flowing into the HVAC module 103 is cooled at the evaporator 105 by the refrigerant of low temperature flowing into the evaporator 105.

At this time, the inflow air is dehumidified during passing through the evaporator 105, and the door 111 is adapted for the cooled air to pass through the interior condenser 107. After that, the air is heated at the interior condenser 107 and is then flowed into the cabin of the vehicle. Therefore, the cabin of the vehicle is dehumidified. In addition, the refrigerant compressed at the compressor 113 is supplied to the exterior condenser 101 by operation of the first valve 117 being a 3-Way valve so as to defrost the surface of the exterior condenser 101.

Figure 6:
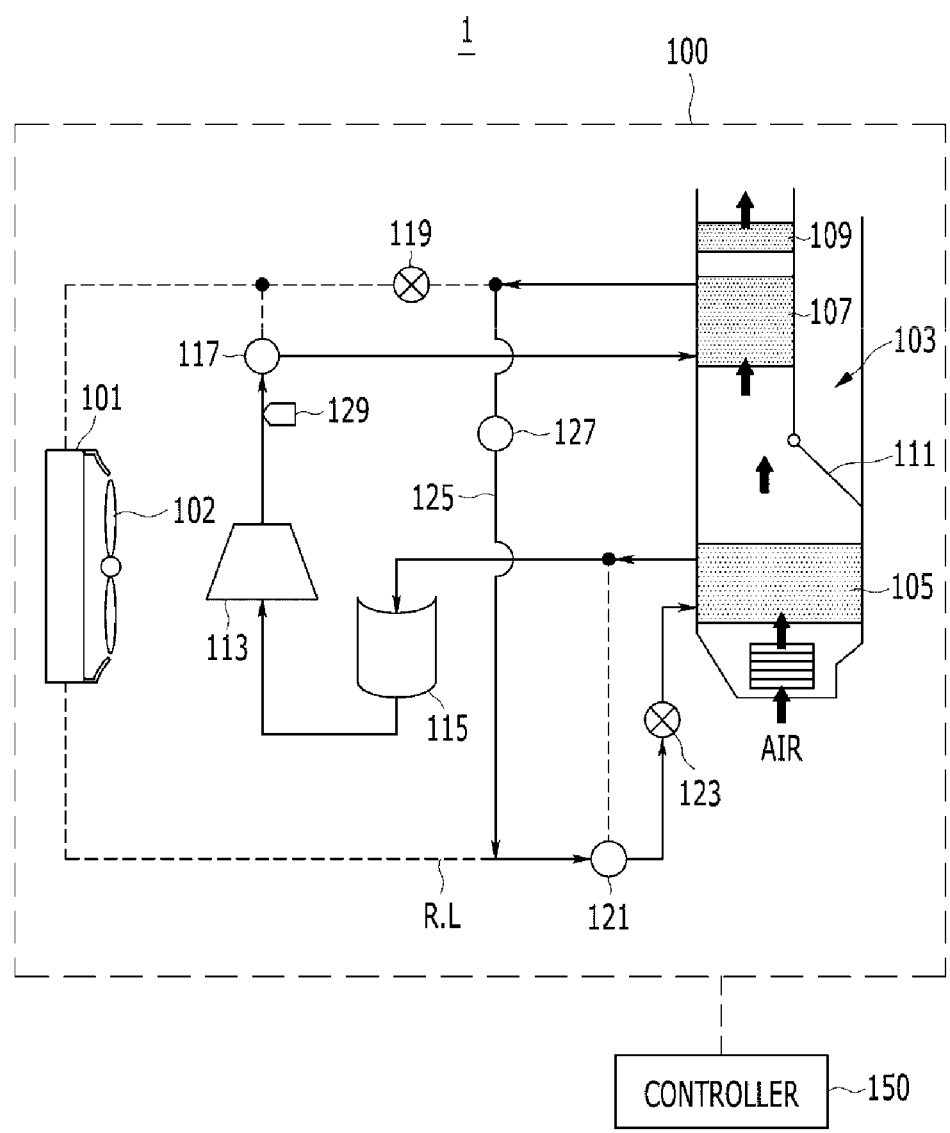
FIG. 6 is an operational chart of an exemplary heat pump system for a vehicle according to the present invention at a dehumidification/defrosting mode in a case when an ambient temperature is an extremely low temperature.

In various embodiments, the heat pump system 1 operates at the dehumidification/defrosting mode in a case that an ambient temperature of the vehicle is extremely low. Referring to FIG. 6, operation and control method of the heat pump system 1 at the dehumidification/defrosting mode will be described in detail.

As shown in FIG. 6, the controller 150 opens the second valve 121 so as for the refrigerant to flow into the second expansion valve 123 at the dehumidification/defrosting mode in a case that the ambient temperature of the vehicle is extremely low.

Then, the refrigerant of low temperature flowing into the second expansion valve 123 is expanded and is then supplied to the evaporator 105 along the refrigerant line R.L.

After that, the refrigerant is evaporated at the evaporator 105 through heat exchange with the air, and is compressed into the high temperature/pressure gaseous refrigerant during passing through the accumulator 115 and the compressor 113 along the refrigerant line R.L.

The controller 150 opens the first valve 117 so as for the refrigerant passing through the compressor 113 to be supplied to the interior condenser 107 and opens the refrigerant line R.L connected to the interior condenser 107.

The pressure sensor 129 mounted on the refrigerant line R.L between the compressor 113 and the first valve 117 detects the pressure of the refrigerant flowing out from the compressor 113 and outputs the detected value to the controller 150.

The controller 150 determines of the pressure of the refrigerant from the detected valued by the pressure sensor 129 and controls the opening of the first valve 117 and the opening of the second expansion valve 123 according to the demanded vehicle performance.

The refrigerant supplied to the interior condenser 107 by operation of the first valve 117 passes the interior condenser 107 and is then flowed along the bypass line 125 by operation of the third valve 127.

The refrigerant is supplied back to the second expansion valve 123 by operation of the second valve 121 and is expanded at the second expansion valve 123. After that, the refrigerant is supplied to the evaporator 105. Finally, the refrigerant circulates along the refrigerant line R.L and the bypass line 125.

The air flowing into the HVAC module 103 is cooled at the evaporator 105 by the refrigerant of low temperature flowing into the evaporator 105.

At this time, the inflow air is dehumidified during passing through the evaporator 105, and the door 111 is adapted for the cooled air to pass through the interior condenser 107. After that, the air is heated at the interior condenser 107 and is then flowed into the cabin of the vehicle. Therefore, the cabin of the vehicle is dehumidified.

At this time, the heat pump system 1 stops supply of the refrigerant to the exterior condenser 101 having the surface being seriously frozen in the extremely low temperature. Therefore, the exterior condenser 101 is defrosted efficiently.

Meanwhile, it is exemplified that the PTC heater 109 as well as the air is operated at the warming mode according to various embodiments of the present invention. However, the scope of the present invention is not limited to this. That is, it can be determined according to a heating temperature set by the driver if the PTC heater 109 is operated.

The heat pump system 1 for the vehicle and the control method thereof according to various embodiments of the present invention improves heating performance, dehumidification performance, and defrost performance of the vehicle by controlling flow of the refrigerant In addition, defrost of the exterior condenser 101 is efficiently performed by preventing the refrigerant from flowing into the exterior condenser 101 in the extremely low temperature.

In addition, since the heat pump system as well as the PTC heater 109 is operated at the warming mode in the extremely low temperature, increase of power consumption is prevented and mileage of the vehicle is increased by reducing heating load.

Since each of the first and second valves 117 and 121 is the 3-Way valve, the first and second valves 117 and 121 are prevented from being open or closed frequently at each mode and noise and vibration due to frequent operation of the first and second valves 117 and 121 are reduced.

In addition, since the bypass line 125 provided with the third valve 127 is used, dehumidification and defrosting can be simultaneously performed without an additional device for defrosting the exterior condenser 101. Therefore, layout can be simplified and system package can be reduced.

For convenience in explanation and accurate definition in the appended claims, the terms front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A heat pump system for a vehicle having air conditioning means for cooling or warming a cabin of the vehicle by using a refrigerant circulating through a refrigerant line, wherein the air conditioning means comprises:
    an exterior condenser provided in an engine compartment of the vehicle, condensing the refrigerant through heat exchanged with an air, and provided with a cooling fan at a rear thereof;
    a heating, ventilation and air conditioning (HVAC) module fluidly communicated with the exterior condenser, and provided with an evaporator and a door to selectively flow the air passing through the evaporator into an interior condenser and a positive temperature coefficient (PTC) heater according to warming, cooling, or dehumidification mode;
    a compressor connected to the evaporator through a refrigerant line and adapted to compress gaseous refrigerant;
    an accumulator provided on the refrigerant line between the compressor and the evaporator and adapted to supply the gaseous refrigerant to the compressor;
    a first valve selectively operable in a first opening position or a second opening position and selectively supplying the refrigerant flowing from the compressor directly to the interior condenser in the first opening position of the first valve or from the compressor directly to the exterior condenser in the second opening position of the first valve according to the warming, cooling, or dehumidification mode of the vehicle;
    a first expansion valve to receive the refrigerant passing through the interior condenser and adapted to expanding the refrigerant;
    a second valve selectively operable in a first opening position or a second opening position and selectively supplying the refrigerant which is expanded at the first expansion valve and then passes through the exterior condenser, to the evaporator in the first opening position of the second valve or to the accumulator in the second opening position of the second valve, the refrigerant being configured to flow through the exterior condenser and the second valve sequentially and then to either the evaporator or the accumulator;
    a second expansion valve disposed between the evaporator and the second valve, and adapted to expand the refrigerant passing through the second valve, wherein the evaporator is disposed downstream of the second expansion valve and the second valve is disposed upstream of the second expansion valve;
    a bypass line flowing the refrigerant passing through the interior condenser into the evaporator or the accumulator without passing through the exterior condenser by operation of the second valve; and
    a third valve provided at the bypass line and adapted to selectively supply the refrigerant to the refrigerant line connected to the second valve.

2. The heat pump system of claim 1, wherein a pressure sensor is mounted at the refrigerant line connecting the compressor with the first valve.

3. The heat pump system of claim 1, wherein each of the first and second valves is 3-way valve.

4. The heat pump system of claim 1, wherein the air conditioning means is connected to a controller and is operated by a control signal of the controller.

5. A method for controlling the heat pump system of claim 1, wherein, at the warming mode:
    a refrigerant, a temperature of which is raised at the exterior condenser through heat exchange with an air, is supplied to the interior condenser of the HVAC module after being compressed to a gaseous refrigerant of high temperature/pressure by passing through the accumulator and the compressor;
    the refrigerant passing through the interior condenser is expanded by the first expansion valve and is supplied to the exterior condenser; and
    a temperature of an air passing through the evaporator of the HVAC module rises by selective operation of the interior condenser and the PTC heater, thereby a cabin of the vehicle is warmed up.

6. The method of claim 5, wherein at the cooling mode:
    the refrigerant of low temperature cooled at the exterior condenser by operation of the cooling fan and heat exchange with the air is supplied to the evaporator after being expanded by the second expansion valve;
    the refrigerant evaporated at the evaporator by heat exchanged with the air is supplied to the exterior condenser after being compressed at the accumulator and the compressor; and
    the air cooled at the evaporator by heat exchanged with the refrigerant is directly flowed into the cabin of the vehicle without being flowed into the interior condenser, thereby the cabin of the vehicle is cooled.

7. The method of claim 5, wherein at the dehumidification mode:
    the refrigerant of low temperature cooled at the exterior condenser by heat exchanged with the air is expanded at the second expansion valve, and the expanded refrigerant is supplied to the evaporator;

the refrigerant evaporated at the evaporator by heat exchange with the air is supplied to the interior condenser after being compressed by passing through the accumulator and the compressor;

the refrigerant passing through the interior condenser is supplied to the exterior condenser after being expanded at the first expansion valve and is circulated; and the air cooled during passing through the evaporator of the HVAC module is supplied to the cabin of the vehicle after passing through the interior condenser and the PTC heater, thereby the cabin of the vehicle is dehumidified.

8. The method of claim 7, wherein the controller controls expansion amount of the refrigerant by controlling openings of the first and second expansion valves at the dehumidification mode.

9. The method of claim 5, wherein at the dehumidification/defrosting mode:

the refrigerant of low temperature cooled at the exterior condenser by heat exchanged with the air is expanded at the second expansion valve, and the expanded refrigerant is supplied to the evaporator;

the refrigerant evaporated at the evaporator by heat exchange with the air is supplied respectively to the exterior condenser and the interior condenser after being compressed by passing through the accumulator and the compressor;

the refrigerant passing through the interior condenser is supplied back to the second expansion valve, and the refrigerant expanded at the second expansion valve is supplied to the evaporator and is circulated;

the air cooled during passing through the evaporator of the HVAC module is supplied to the cabin of the vehicle after passing through the interior condenser and the PTC heater, thereby the cabin of the vehicle is dehumidified; and the compressed refrigerant is supplied to the exterior condenser and defrosts the exterior condenser, a surface of which is frozen.

10. The method of claim 9, wherein at the dehumidification/defrosting mode in a case when an ambient temperature is lower than zero degree Celsius:

the refrigerant is supplied to the evaporator after being expanded at the second expansion valve;

the refrigerant evaporated at the evaporator by heat exchange with the air is supplied to the interior condenser after being compressed during passing through the accumulator and the compressor;

the refrigerant passing through the interior condenser is supplied back to the second expansion valve along the bypass line, and the refrigerant expanded at the second expansion valve is supplied to the evaporator and is circulated;

the air cooled during passing through the evaporator of the HVAC module is supplied to the cabin of the vehicle after passing through the interior condenser and the PTC heater, thereby the cabin of the vehicle is dehumidified; and the compressed refrigerant is not supplied to the exterior condenser such that the exterior condenser is defrosted.

11. The method of claim 5, wherein the controller is to control operation of the cooling fan according to a temperature of the vehicle and a temperature of the refrigerant at the warming mode, the cooling mode, the dehumidification mode, or the dehumidification/defrosting mode.

* * * * *